(No Model.)

W. R. MOUNT.
ROLLER SKATE.

No. 324,875. Patented Aug. 25, 1885.

Witnesses.
Charles Ratke
Fred F. Rost

Inventor.
William R Mount
by W J Dennis
attorney

UNITED STATES PATENT OFFICE.

WILLIAM R. MOUNT, OF MILTON, INDIANA.

ROLLER-SKATE.

SPECIFICATION forming part of Letters Patent No. 324,875, dated August 25, 1885.

Application filed March 27, 1885. (No model.)

*To all whom it may concern:*

Be it known that I, WILLIAM R. MOUNT, a citizen of the United States, residing at Milton, in the county of Wayne and State of Indiana, have invented certain new and useful Improvements in Roller-Skates, of which the following is a specification, reference being had to the accompanying drawings.

My invention relates to that class of roller-skates used in parlor and rink skating.

My invention consists in a novel device for producing the requisite tension in roller-skates; also in the method of securing the wheel to the axle and protecting the end thereof.

Figure 1:
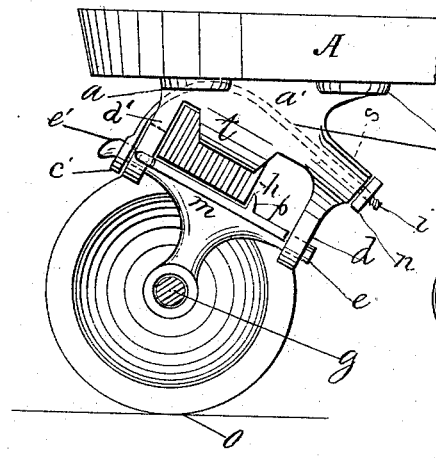
Figure 2:
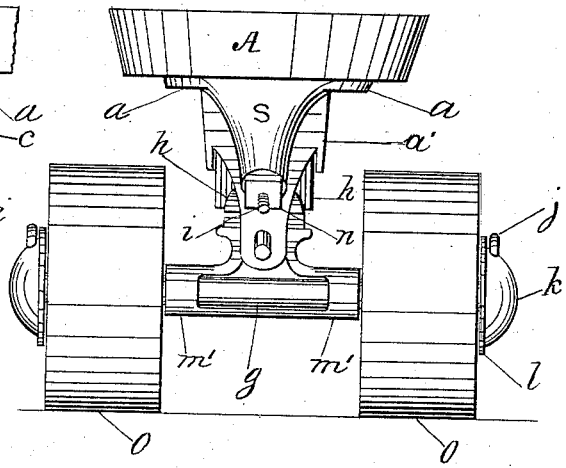
Figure 3:
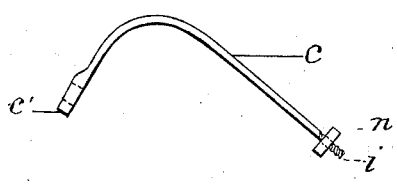
Figure 4:
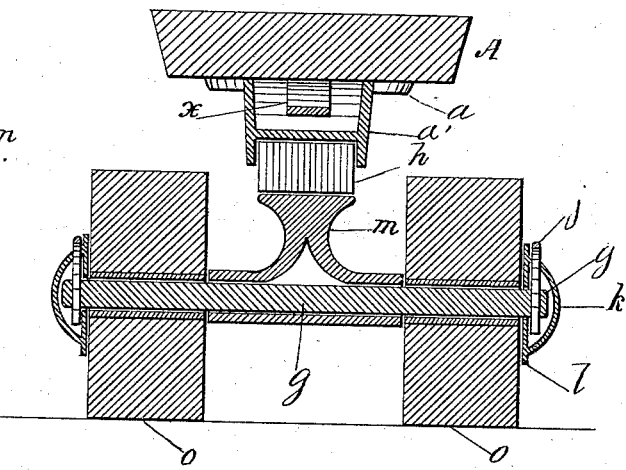
Figure 5:
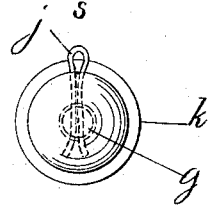

In the drawings, Figure 1 is a side elevation of the truck of my improved skate. Fig. 2 is a rear elevation of the same. Fig. 3 is a plan view of the tension-bar. Fig. 4 is a transverse vertical section of the truck, showing fastening device in connection with the end of the axle. Fig. 5 is a side elevation of my improved washer and fastener.

In the drawings, A, Fig. 1, represents the foot-piece of a roller-skate of the common form. $a\,a$ is the face-plate of the hanger-frame, which is secured to the foot-piece by screws or other suitable means, the body $a'$ of the hanger-frame terminating in depending arms $d\,d'$, one of which, $d$, has a hole in its lower end to receive a journal-arm, $e$, of the saddle $m$, while the opposite arm, $d'$, has an open slot in its lower end, to receive a corresponding journal-arm, $e'$, of the saddle, the outer end of which is slightly curved downward, to receive and hold in position one end of the tension-bar $c$, which is provided with a loop, $c'$, which is fitted upon and actuates the journal-arm $e'$.

The tension-bar $c$, Figs. 3 and 1, is composed of a metallic bar or strap made flexible, and with one end terminating in a screw-thread, $i$, fitted with a nut, $n$, the body of which is curved in such manner that the plane of the opposite end is nearly at right angles to the plane of the main body, the end terminating in a loop, $c'$, as before described. A cylindrical projection, $s$, which is a continuation of the hanger-frame $a'$, extends back and down from said frame, from the under surface of which the arm $d$ descends, said cylindrical projection being hollow to admit the screw end of the tension-bar $c$, and the end of the same forming a shoulder, against which the nut $n$ on the screw $i$ of the tension-bar $c$ has its bearing. The saddle $m$ has a rectangular surface, upon which the rubber spring $h$ rests, and is provided with an opening in its base $m'\,m'$, to receive the axle $g$. A spur or projection, $p$, rises from the surface of the saddle $m$, which serves as a rest or support for the rubber spring $h$, and serves to hold the same in position longitudinally, while vertical projections $t\,t$ from the hanger-frame $a'$ retain the spring $h$ in place laterally. When the journal-arm $e$ is placed in the hole provided for it in the vertical arm $d$, the corresponding journal-arm, $e'$, is inserted in the slot in the arm $d'$, the loop $c'$ of the tension-bar is placed around the curved end of the journal-arm $e'$, while the screw end $i$ of the tension-bar $c$ is passed through the opening $x$ in the hanger-frame $a'$, as seen in Fig. 4, and passed over the top of the rubber spring $h$ and through the opening in the cylindrical projection $s$, as shown in dotted lines in Fig. 1, when the nut $n$ is fixed upon the screw $i$, and as the nut is turned home on the tension-bar $c$ the journal-arm $e'$ is raised, and the saddle and the hanger-frame, having the spring $h$ between them, are brought nearer to each other, and the pressure on the spring $h$ is increased to any desired degree as the tension-bar is shortened by the nut $n$. The hanger-frame and foot-piece are permitted a lateral oscillating motion upon the journal-arms $e\,e'$ of the saddle independently of the axle of the floor-wheels.

In Fig. 4, $k$ is a convex cap with a hollow interior in the form of a vertical hemisphere, the base of the circumference being in a vertical plane and composed of a circular plate cast upon and solid with the hemispherical portion thereof, and provided with a hole in its center of proper size to fit snugly upon the end of the axle $g$, said axle having a vertical hole near the end to receive a double spring linchpin, $j$. The base-plate $l$ of the convex cap $k$ fits closely on the axle $g$, as seen in Fig. 4, facing against the outer surface of the floor-wheel $o$, and serves as a washer to hold said wheel in place in its revolutions. A hole is made in the top surface of the convex cap vertically in line with the corresponding hole in the axle $g$, when the linchpin $j$ is inserted in the hole in the convex cap and passed down through the hole in the end of the axle terminating inside of the convex cap, as shown in Fig. 5, where the ends of the linchpin $j$ are spread by ∧-shaped projection on the inside surface of the base-plate $l$.

The tension bar or strap $c$ may be constructed with the central portion composed of links or in the form of a chain, and subserve the same purpose.

Having thus fully described my said improvements, what I claim as new, and desire to secure by Letters Patent, is—

1. The combination, with the hanger-frame and saddle, of the journal-arm bent at its end, and the tension-bar having a loop at its end for the journal-arm, and passing over the cushion and secured by a screw-thread and nut in the hanger-frame, substantially as and for the purpose specified.

2. The convex-cap washer composed of a hollow convex cap, $k$, and base-plate $l$, provided with a hole for the linchpin $j$, in combination with the axle $g$.

In testimony whereof I affix my signature in presence of two witnesses.

WILLIAM R. MOUNT.

Witnesses:
ALVIN E. CROCKER,
W. T. DENNIS.